(12) United States Patent (10) Patent No.: US 7,480,407 B2
Imamura et al. (45) Date of Patent: Jan. 20, 2009

(54) SURFACE REGION IDENTIFICATION BY IMAGE AREA SEGMENTATION

(75) Inventors: Atsushi Imamura, Kyoto (JP); Hiroshi Sano, Kyoto (JP); Eiji Nishihara, Kyoto (JP); Junichi Shiomi, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 644 days.

(21) Appl. No.: 11/152,506

(22) Filed: Jun. 15, 2005

(65) Prior Publication Data

US 2006/0018540 A1 Jan. 26, 2006

(30) Foreign Application Priority Data

Jul. 21, 2004 (JP) ............................. 2004-212537

(51) Int. Cl.
*G06K 9/34* (2006.01)
(52) U.S. Cl. ..................................... 382/173
(58) Field of Classification Search ................. 382/100, 382/108, 112–115, 136, 141–152; 348/86, 348/91–92, 125–133; 356/237.1, 394, 398
See application file for complete search history.

(56) References Cited

U.S. PATENT DOCUMENTS 5,220,614 A * 6/1993 Crain ......................... 382/136
6,198,529 B1 3/2001 Clark, Jr. et al.

FOREIGN PATENT DOCUMENTS

| JP | 2002-259967 A | 9/2002 |
| KR | 10-0186384 B1 | 11/1997 |
| KR | 2001-0099501 A | 11/2001 |

* cited by examiner

*Primary Examiner*—Jose L Couso
(74) *Attorney, Agent, or Firm*—McDermott Will & Emery LLP (57) ABSTRACT

The present invention provides a technique to identify layout of surface regions of an object by image area segmentation. A plurality of images is acquired by imaging an object under a plurality of mutually different illumination conditions. By performing area segmentation on this plurality of images, the layouts of the plurality of image areas which is different from the layout of the object surface regions is obtained. Then, the layout of the surface regions on the object is identified based on the layouts of the plurality of image areas.

7 Claims, 12 Drawing Sheets

BASE RESIST REGION RBR: REGION FOR WHICH RESIST IS COATED ON THE BOARD BASE

PATTERN RESIST REGION RPR: REGION FOR WHICH RESIST IS COATED ON THE COPPER WIRING PATTERN

SILK PRINTED REGION RSG: REGION FOR WHICH BLACK LETTERS ARE SILK PRINTED

GOLD PLATED REGION RGP: REGION FOR WHICH GOLD IS PLATED

BOARD BASE REGION RSB: REGION FOR WHICH THE BOARD BASE IS EXPOSED

GR { GREEN AREA G1 — BASE RESIST REGION RBR
     GREEN AREA G2 — PATTERN RESIST REGION RPR

BK { BLACK AREA K1 — SILK PRINTED REGION RSG
     BLACK AREA K2 ⎫
     GOLD AREA GL  ⎬ GOLD PLATED REGION RGP
                   ⎭

BROWN AREA BR — BOARD BASE REGION RSB

Fig.5

SH {
- BRIGHT AREA S1 — BASE RESIST REGION RBR
- BRIGHT AREA S2 — PATTERN RESIST REGION RPR
- BRIGHT AREA S3 — SILK PRINTED REGION RSG
}

METALLIC LUSTER AREA MT — GOLD PLATED REGION RGP

DARK AREA DK — BOARD BASE REGION RSB

Fig.6

+ : REPRESENTATIVE POINTS

RESIST AREA ER — REPRESENTATIVE POINTS PR1, PR2

SILK AREA ES — REPRESENTATIVE POINT PS

GOLD AREA EG — REPRESENTATIVE POINTS PG1, PG2, PG3

BASE AREA EB — REPRESENTATIVE POINT PB

Fig.7

✦ : REPRESENTATIVE POINTS

GOLD AREA EG — REPRESENTATIVE POINTS PG1, PG2, PG3

EX ⎧ RESIST AREA ER — REPRESENTATIVE POINTS PR1, PR2
   ⎨ SILK AREA ES — REPRESENTATIVE POINT PS
   ⎩ BASE AREA EB — REPRESENTATIVE POINT PB

SURFACE REGION IDENTIFICATION BY IMAGE AREA SEGMENTATION

CROSS-REFERENCE TO RELATED APPLICATIONS

The present application claims the priority based on Japanese Patent Application No. 2004-212537 filed on Jul. 21, 2004, the disclosure of which is hereby incorporated herein by reference in its entirety.

BACKGROUND OF THE INVENTION

1. Field of the Invention

This invention relates to technique for identifying layout of surface regions on an object by means of image area segmentation.

2. Description of the Related Art

An inspection apparatus such as a printed circuit board tester detects a defect in a product subject to testing by comparing the layout of each surface region on the product, which is identified from an image of the product, with layout of each surface region on a reference product. With some kind of inspection apparatus, to identify layout of each surface region on an object, area segmentation is performed for dividing the image of the object into a plurality of areas.

However, on the object surface, there are cases when there are regions of the surface for which the reflection characteristics are different, such as metal, a dielectric, and so on. When segmentation according to color or color depth is performed on an image captured from this kind of object, even when illumination conditions are devised, there are cases that it is not possible to identify the layout of the surface regions on the object by means of image area segmentation.

SUMMARY OF THE INVENTION

An object of the present invention is to identify layout of surface regions of an object by image area segmentation.

According to an aspect of the present invention, a method for identifying layout of a plurality of surface regions on an object is provided. The method comprises the steps of: (a) acquiring a plurality of images of the object under a plurality of mutually different illumination conditions; (b) obtaining layouts of a plurality of image areas different from the layout of the plurality of surface regions on the object by performing segmentation on the plurality of images respectively; and (c) identifying the layout of the plurality of surface regions based on the layouts of the plurality of image areas.

With this arrangement, it is possible to identify the surface region layout which is difficult to identify under a single illumination condition.

The present invention may be realized in various aspects, for example, may be realized with aspects such as a method and device for identifying the layout of surface regions on an object, a method and device for inspection using those identification results, a computer program for realizing the functions of these types of methods and devices, a recording medium on which that computer program is recorded, or data signals embodied within carrier waves including that computer program.

These and other objects, features, aspects, and advantages of the present invention will become more apparent from the following detailed description of the preferred embodiments with the accompanying drawings.

DESCRIPTION OF THE PREFERRED EMBODIMENT

Embodiments of the present invention will now be described in the following sequence.
A. First Embodiment:
B. Second Embodiment:
C. Modifications:

A. First Embodiment

Figure 1:
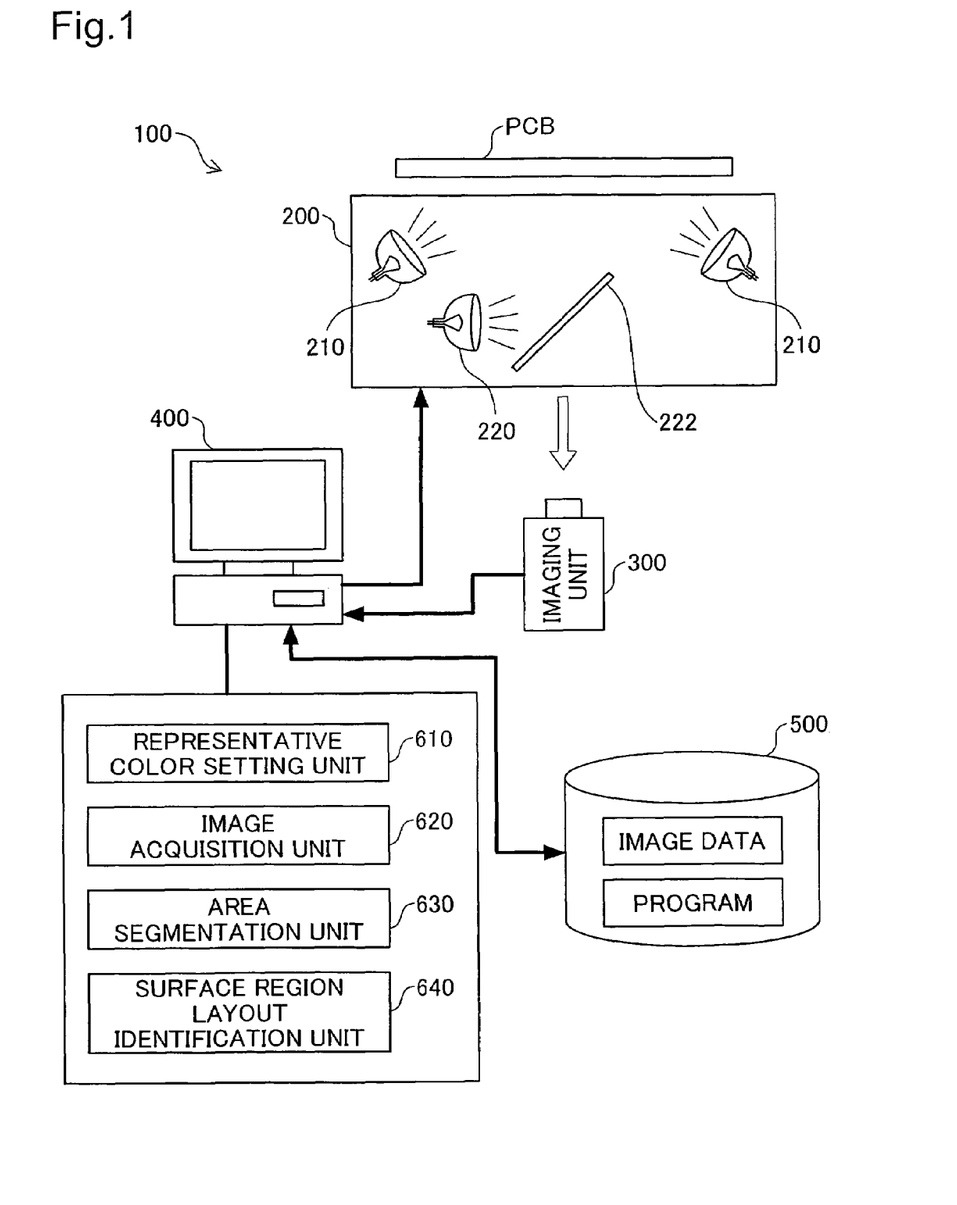
FIG. 1 illustrates the configuration of a printed circuit board tester 100 as an embodiment of the present invention.

FIG. 1 illustrates the configuration of a printed circuit board tester 100 as an embodiment of the present invention. This printed circuit board tester 100 comprises an illumination unit 200 for illuminating the printed circuit board PCB, an imaging unit 300 for capturing an image of the printed circuit board PCB, and a computer 400 for performing control of the overall devices. An external storage device 500 for storing various types of data or a computer program is connected to the computer 400.

The computer 400 comprises a representative color setting unit 610, an image acquisition unit 620, an area segmentation unit 630, and a surface region layout identification unit 640. The functions of each of these units are realized by the computer 400 executing the computer program stored in the external storage device 500.

The illumination unit 200 comprises two light sources 210 for oblique illumination, a light source 220 and a half mirror 222 for incident-light illumination. Here, the "oblique illumination" means illumination of an observational object (printed circuit board PCB) by light which entering from an off-axial direction of the imaging unit 300. The "incident-light illumination" means illumination of an observational object by light entering from the direction of the imaging unit 300. The incident-light illumination is also called "coaxial reflected light illumination."

Figure 2:
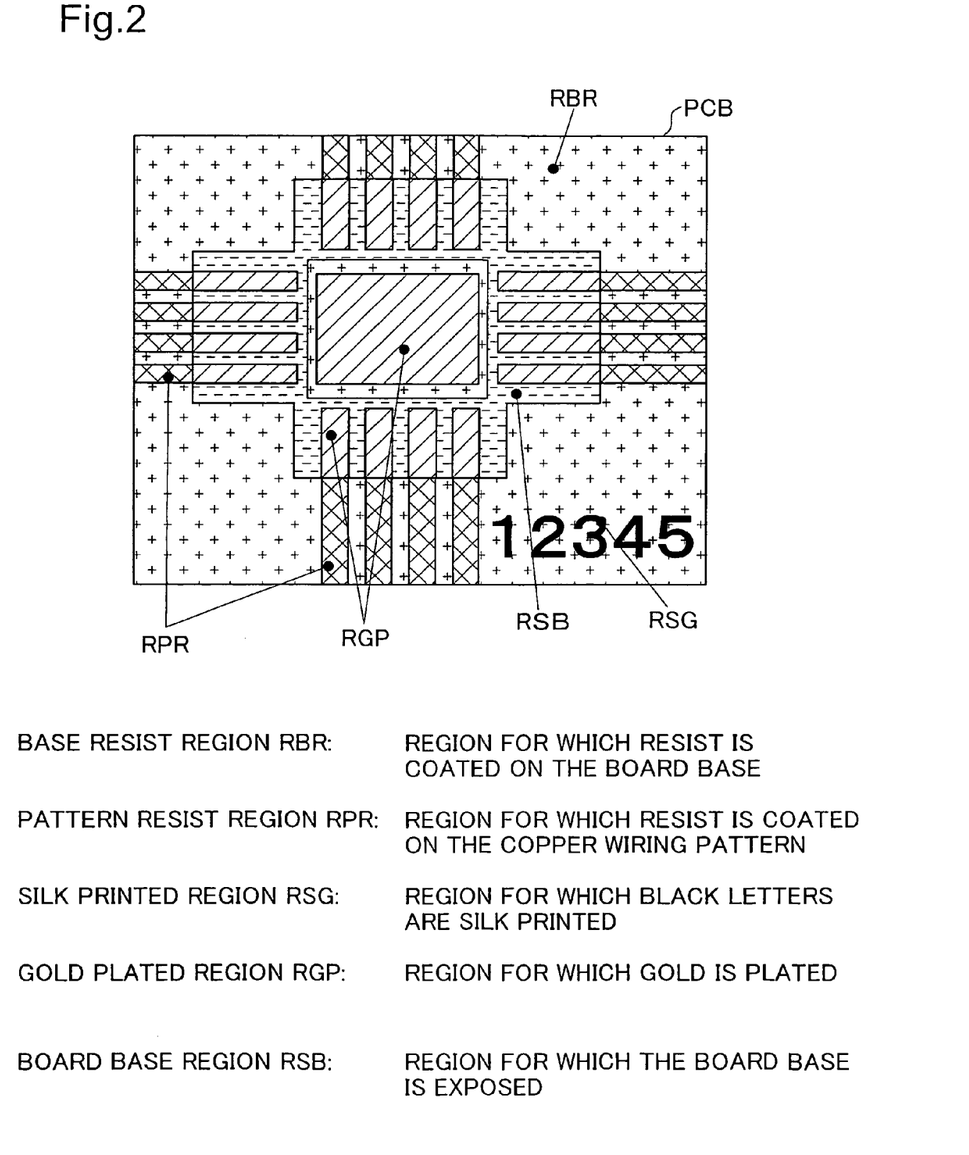
FIG. 2 illustrates surface of a printed circuit board PCB.

FIG. 2 illustrates surface of a printed circuit board PCB. The surface of the printed circuit board PCB comprises a base resist region RBR for which resist is coated on the board base, a pattern resist region RPR for which resist is coated on a copper wiring pattern, a silk printed region RSG on which black characters are silk printed on the board base, a gold plated region RGP for which gold is plated, and a board base region RSB for which the board base is exposed.

Figure 3:
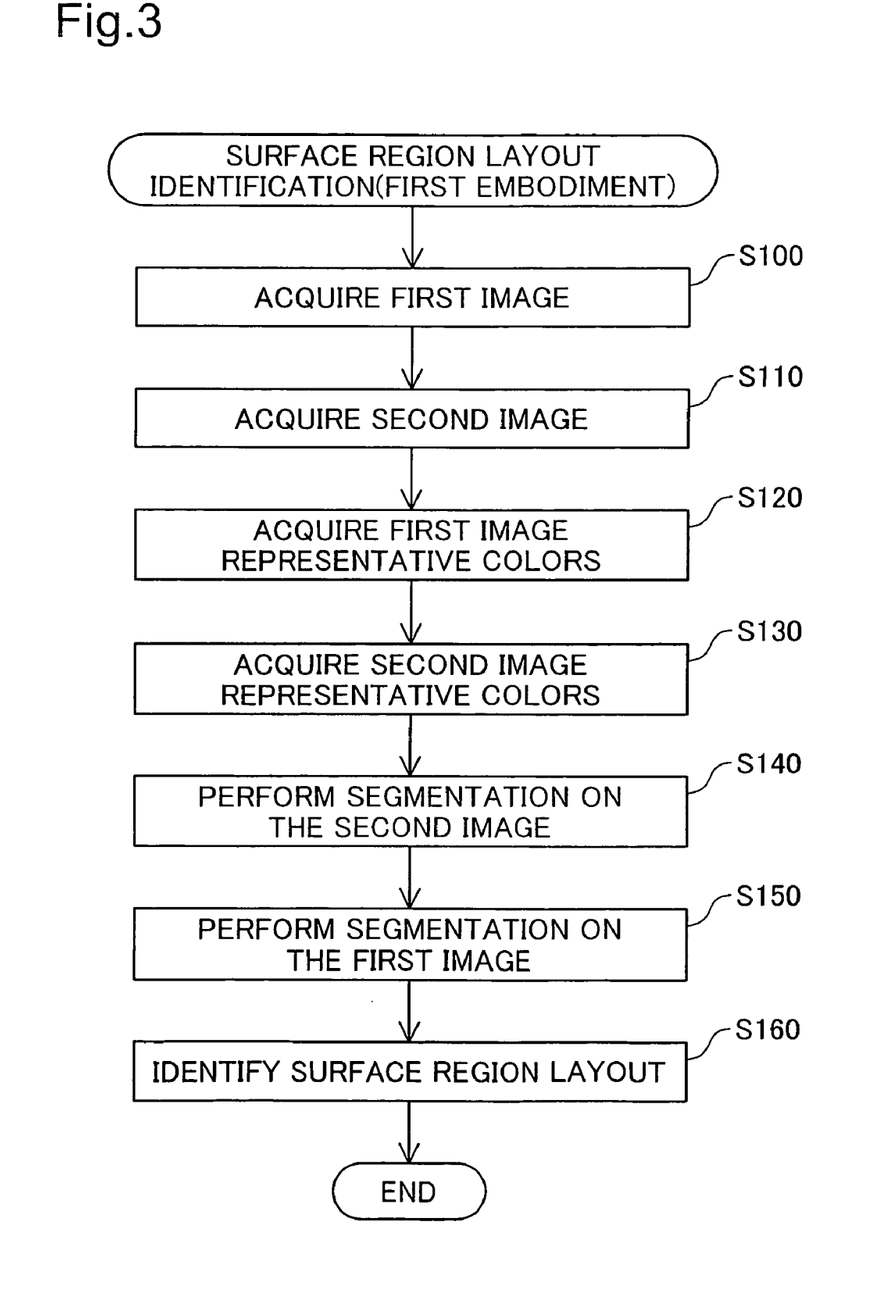
FIG. 3 is a flowchart showing the procedure for identifying the surface region layout of the printed circuit board in the first embodiment.

FIG. 3 is a flowchart showing the procedure for identifying the surface region layout of the printed circuit board in the first embodiment.

At step S100, the image acquisition unit 620 (FIG. 1) acquires a color image of the printed circuit board PCB under the oblique illumination. In specific terms, the image acquisition unit 620 provides an instruction to the illumination unit 200 (FIG. 1) for turning on the light source 210 and turning off the light source 220. In a condition with the light source 210 turned on or the condition with the printed circuit board PCB oblique illuminated, the image acquisition unit 620 acquires the first image of the printed circuit board PCB from the imaging unit 300 (FIG. 1).

At step S100, the image acquisition unit 620 performs smoothing process (blurring process) as necessary on the acquired first image. With the smoothing process, it is possible to use various smoothing filters such as a median filter, Gaussian filter, or moving average filter. By performing this smoothing process, it is possible to remove a singular pixel existing within the image data, making it possible to obtain image data with little garbage (noise component). When executing the procedure from step S110 and thereafter in relation to the first image acquired in advance, image data is read from the external storage device 500 (FIG. 1) at step S100.

Figure 4:
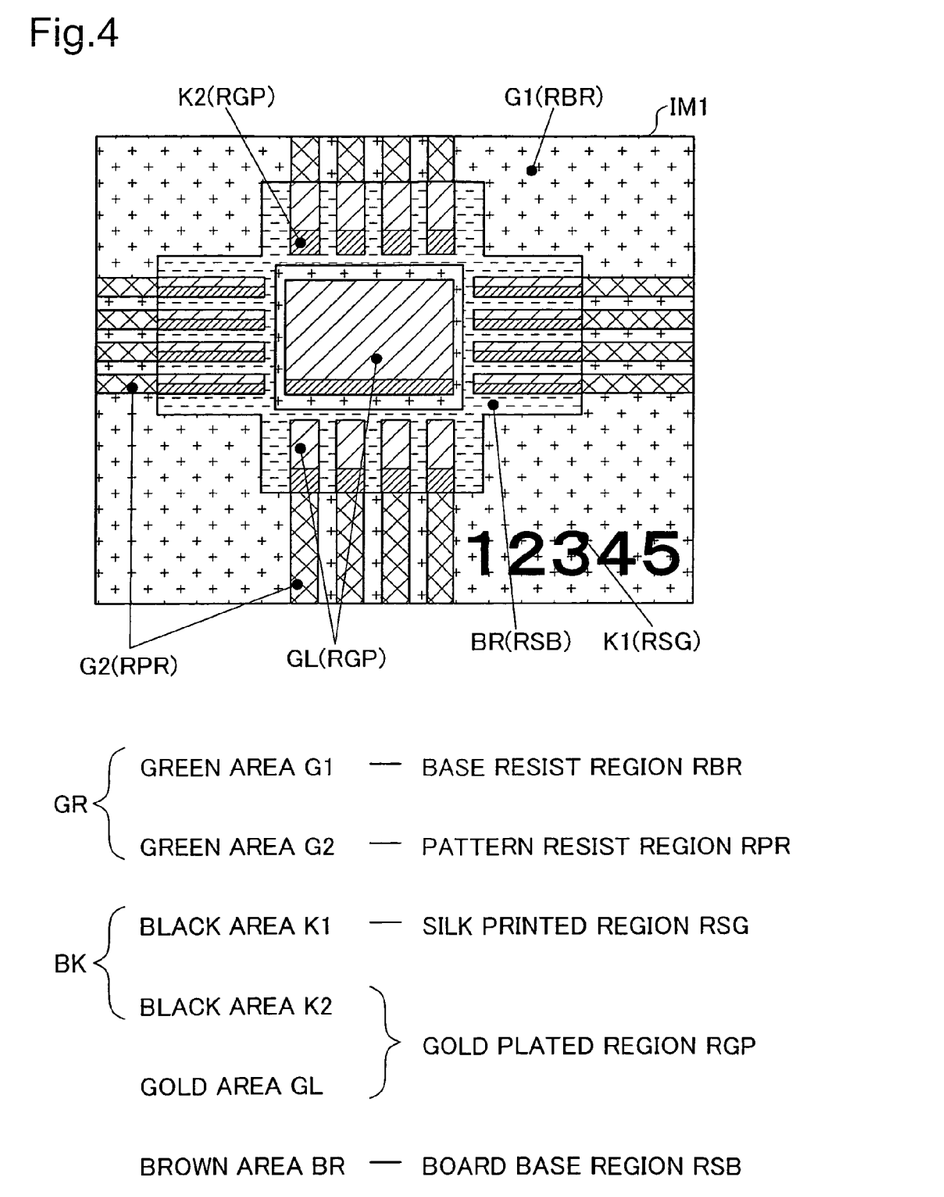
FIG. 4 depicts the first image IM1 of the printed circuit board PCB acquired under the oblique illumination.

FIG. 4 depicts the first image IM1 of the printed circuit board PCB (FIG. 2) acquired under the oblique illumination. This first image IM1 comprises two green areas G1 and G2, two black areas K1 and K2, a gold area GL, and a brown area BR. Note that with this embodiment, these two green areas G1 and G2 are collectively called as a "green area GR," and the two black areas K1 and K2 are collectively called as a "black area BK."

With the first image IM1, the base resist region RBR of the printed circuit board PCB is represented by the first green area G1, and the pattern resist region RPR is represented by the second green area G2. Similarly, the silk printed region RSG and the board base region RSB are represented by the first black area K1 and the brown area BR respectively. Meanwhile, the gold plated region RGP of the printed circuit board PCB is represented by two areas of the second black area K2 and the gold area GL according to a difference in the surface conditions. The reason that the gold plated region RGP is represented by two areas K2 and GL of different colors in this way is because the first image IM1 is acquired under the oblique illumination for which intensity of the reflected light entering to the imaging unit 300 (FIG. 1) from the metal surface is easily affected by the condition of the metal surface At step S110 (FIG. 3), the image acquisition unit 620 acquires a color image of the printed circuit board PCB under the incident-light illumination. In specific terms, the image acquisition unit 620 supplies an instruction for turning on the light source 220 and turning off the light source 210 to the illumination unit 200. When the light source 220 is lit, the light from the light source 220 is reflected by the half mirror 222 into the direction of the printed circuit board PCB, and the printed circuit board PCB is illuminated by the light coming from the direction of the imaging unit 300. In this way, in a condition with the printed circuit board PCB illuminated by the incident-light illumination, the image acquisition unit 620 acquires the second image of the printed circuit board PCB from the imaging unit 300.

Note that at step S110 as well, the image acquisition unit 620 performs smoothing process as necessary on the acquired second image. Also, when executing the procedure from step S120 and thereafter in relation to the second image acquired in advance, the image data is read from the external storage device 500 (FIG. 1) at step S110.

Figure 5:
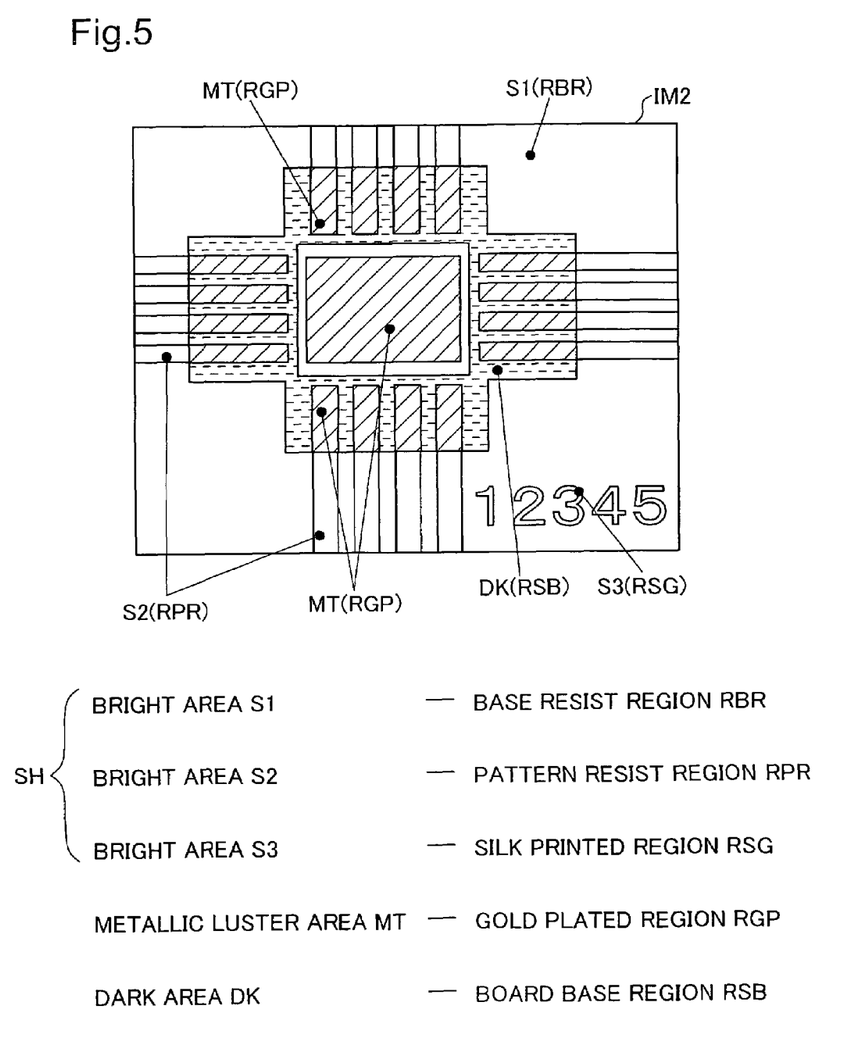
FIG. 5 depicts the second image IM2 of the printed circuit board PCB acquired under the incident-light illumination.

FIG. 5 depicts the second image IM2 of the printed circuit board PCB (FIG. 2) acquired under the incident-light illumination. This second image IM2 comprises three bright areas S1, S2 and S3, a metallic luster area MT, and a dark area DK. Note that with this embodiment, these three bright areas S1; S2 and S3 are collectively called as a "bright area SH."

With the second image IM2, the gold plated region RGP of the printed circuit board PCB is represented as a sort of area being metallic luster area MT in contrast to the first image IM1 shown in FIG. 4. The board base region RSB is represented as a sort of area being dark area DK as with the first image IM1. The base resist region RBR, the pattern resist region RPR, and the silk printed region RSG of printed circuit board PCB are represented by the first bright area S1, the second bright area S2, and the third bright area S3 respectively. In this way, these three regions RBR, RPR and RSG of the printed circuit board PCB represented by areas with different colors in the first image IM1 are represented by the bright areas S1, S2 and S3 in the second image IM2. Because smooth surfaces of these regions RBR, RPR and RSG cause mirror reflection, and the mirror reflected light, which has almost the same color as the light emitted by the light source 220 (FIG. 1), enters to the imaging unit 300 (FIG. 1).

At step S120 of FIG. 3, the representative color setting unit 610 (FIG. 1) acquires the representative colors for the segmentation of the first image. In specific terms, the representative color setting unit 610 displays the first image on the display unit of the computer 400. The user specifies the representative points of the image areas to be extracted from the first image and the second image (hereafter also called simply "extraction areas") on the displayed first image by using a pointing device such as a mouse. The representative color setting unit 610 determines the representative colors for segmentation of the first image based on the colors at the representative points in the first image.

Figure 6:
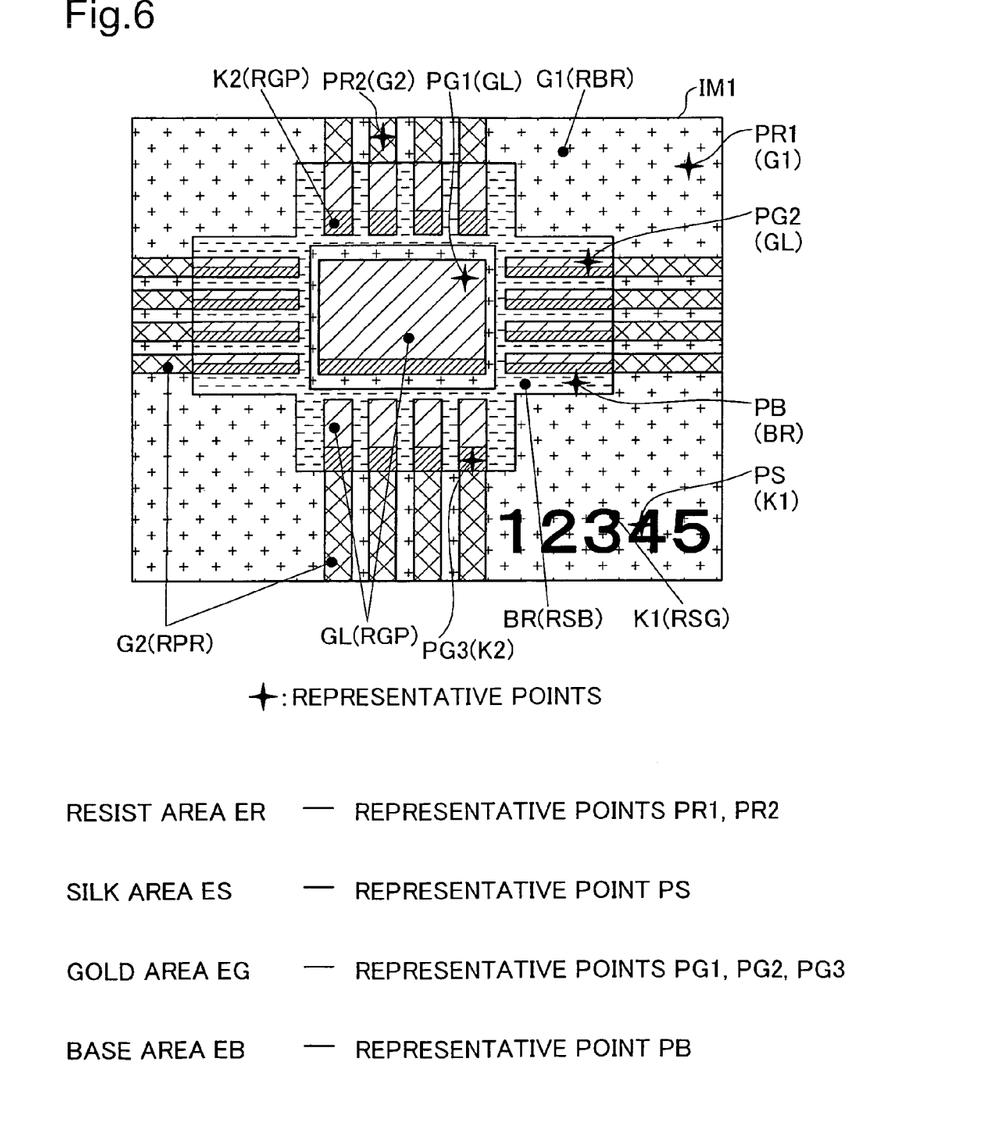
FIG. 6 is an explanatory drawing showing the way of acquiring the representative colors for segmentation of the first image IM1.

FIG. 6 is an explanatory drawing showing the way of acquiring the representative colors for segmentation of the first image IM1. The user inputs the names of the four extraction areas ER, ES, EG and EB (e.g. "resist area," "silk area," etc.) into the dialog box on the screen, and specifies the representative points (shown by star marks) for acquiring the representative colors of each extraction area on the first image IM1. The representative points are specified at least one for each extraction area. With the example in FIG. 6, the representative points PR1 and PR2 are specified for the resist area ER. Similarly, one representative point PS is specified for the silk area ES, three representative points PG1, PG2 and PG3 are specified for the gold area EG, one representative point PB is specified for the base area EB.

When a plurality of representative points are specified for a single extraction area, the representative color setting unit 610 selects representative points for which color is stable from among the plurality of representative points. In specific terms, the representative color setting unit 610 calculates the maximum value of lightness difference between colors at mutually different representative points among the plurality of the representative points. When the maximum value of the lightness difference is less than a predetermined threshold value, color of the representative points is determined to be stable, and all of the plurality of representative points is selected. Meanwhile, when the maximum value of the lightness difference is greater than the predetermined threshold value, color of the representative points is determined to be unstable. When color of the representative points is unstable, one or more representative points with lightness value lower than specific value are excluded, and the remaining representative points are selected. Average color of colors at thus selected representative points is set for the representative color of the extraction area. Note that when one representative point is specified for one extraction area, the representative color is set to the color at the representative point. With the example in FIG. 6, the representative color of the silk area ES is set to the color K1 at the representative point PS, and the representative color of the base area EB is set to the color BR at the representative point PB.

With the example in FIG. 6, a plurality of representative points are specified for each of the resist area ER and the gold area EG. The colors at the representative points PR1 and PR2 of the resist area ER have a low lightness difference, so the representative color of the resist area ER is set to the average color of the color G1 at the representative point PR1 and the color G2 at the representative point PR2. Meanwhile, for the gold area EG, the lightness difference is small for the color GL at the representative point PG1 and the color GL at the representative point PG2 of the gold area EG, but the lightness difference between the color GL at these representative points PG1 and PG2, and the color K2 at the representative point PG3 is large. Because of this, the representative color setting unit 610 excludes the representative point PG3 with low lightness and sets the representative color of the gold area EG to the average color GL at the remaining representative points PG1 and PG2.

With the first embodiment, representative points used for setting the representative color are selected based on the lightness value of the colors at the representative points. In general, any method for specifying the representative points is also acceptable if it is possible to specify the representative points for setting representative colors which are suitable for segmentation. For example, when the index value representing the difference between color at a representative point set for a certain extraction area and the representative color of another extraction area is less than a predetermined value, the representative point may also be excluded. Hereafter such an index value representing difference between two colors is also called "distance index value". When the distance index value between colors at mutually different representative points specified for the same extraction area is greater than a predetermined value, it is also possible to make the user to specify the representative point to be selected. Note that any index value representing difference of colors, such as geometrical distance of color points representing two colors in the RGB color space regarded as a three dimensional Euclidean space, and color difference $\Delta E$ for the L*a*b* color coordinate system, may be used for the distance index value.

At step S130 (FIG. 3), the representative color setting unit 610 (FIG. 1) acquires the representative colors for segmentation of the second image IM2 and also selects the extraction area used for identification of the surface region layout. In specific terms, the representative colors for the segmentation of the second image IM2 is determined based on colors at the plurality of representative points, of which positions are specified by the user at step S120, in the second image IM2. When a plurality of representative points is specified for a single extraction area, the representative color setting unit 610 sets the average color of colors at the plurality of representative points as the representative color of that extraction area. Meanwhile, when one representative point is specified for a single extraction area, the representative color of that extraction area is set to the color at one representative point.

Figure 7:
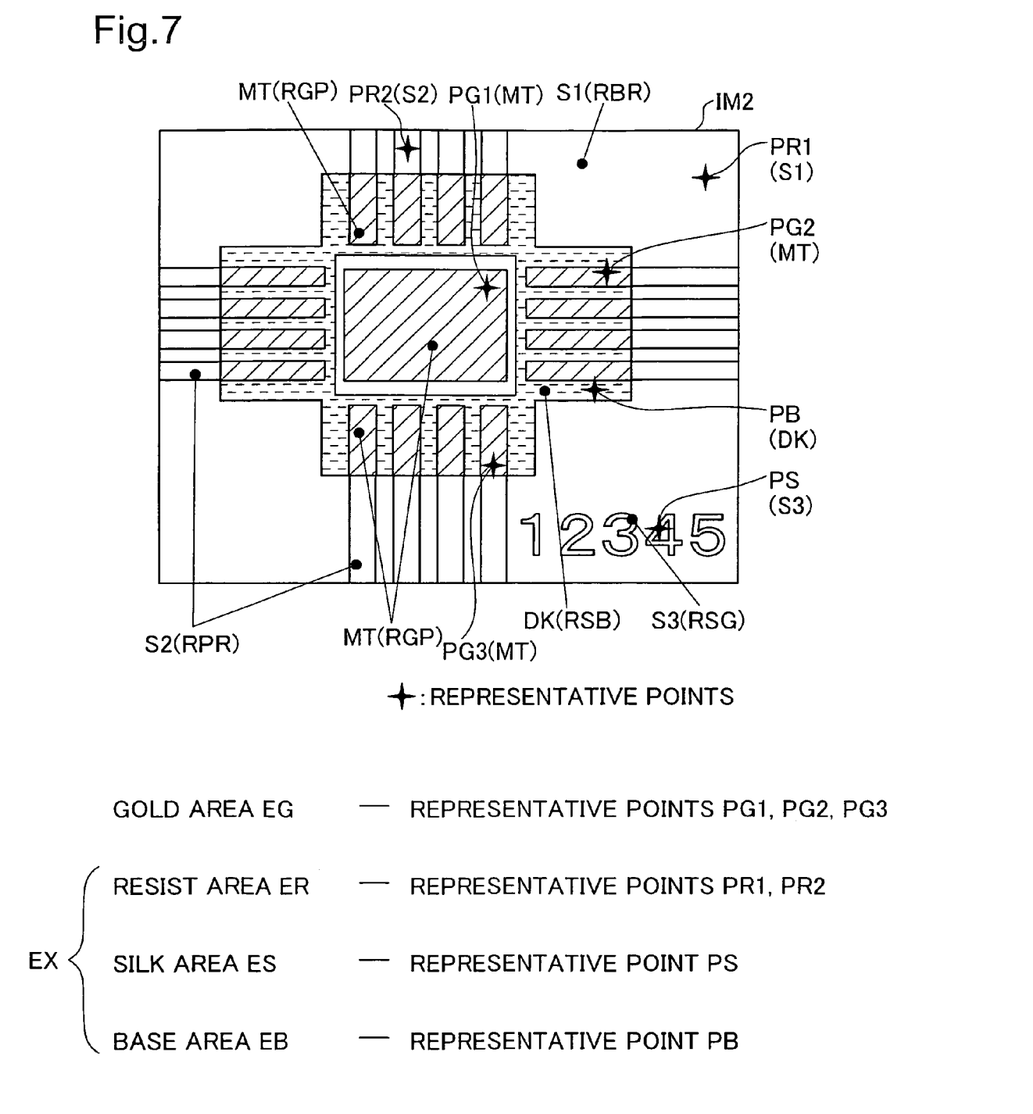
FIG. 7 is an explanatory drawing showing the way of acquiring representative colors used for segmentation of the second image IM2.

FIG. 7 is an explanatory drawing showing the way of acquiring representative colors used for segmentation of the second image IM2. As representative points for acquiring the representative colors, the same points as the representative points shown in FIG. 6 are used. The user specifies the areas to be selected from the second image IM2 using the dialog box on the screen. In the example in FIG. 7, the area used for identifying the surface region layout is set to the gold area EG. With the example in FIG. 7, the representative color of the gold area EG is set to the average color MT at the representative points PG1, PG2 and PG3. The representative color of the resist area ER which is a non-gold area EX is set to the average color of the color S1 at the representative point PR1 and the color S2 at the representative point PR2. Similarly, the representative colors of the silk area ES and the base area EB which are the non-gold area EX are set respectively to the color S3 at the representative point PS and the color DK at the representative point PB.

Note that with the first embodiment, the user specifies the area selected from the second image IM2, but it is also possible to select an area for which the representative point color is stable by analyzing the second image IM2. In this case, among the four areas EG, ER, ES and EB, areas for which color is stable are the gold area EG, the silk area ES, and the base area EB. So these areas EG, ES and EB are selected.

At step S140 (FIG. 3), the area segmentation unit 630 (FIG. 1) performs segmentation of the second image IM2 based on the representative colors set at step S130. Then, of the areas generated by segmentation, areas selected at step S130 are extracted.

Note that the segmentation performed at step S140, may be performed by obtaining the distance index value between the color of each pixel of the second image IM2 and the plurality of representative colors, and classifying each pixel to representative colors for which the distance index value is a minimum, for example. It is also possible to perform the segmentation performed at step S150 in the same way. The segmentation method performed at steps S140 and S150 may be any segmentation method that classifies each pixel of the image to predetermined representative colors, for example, the segmentation may also be performed by the method disclosed in JP2002-259667A.

Figure 8A:
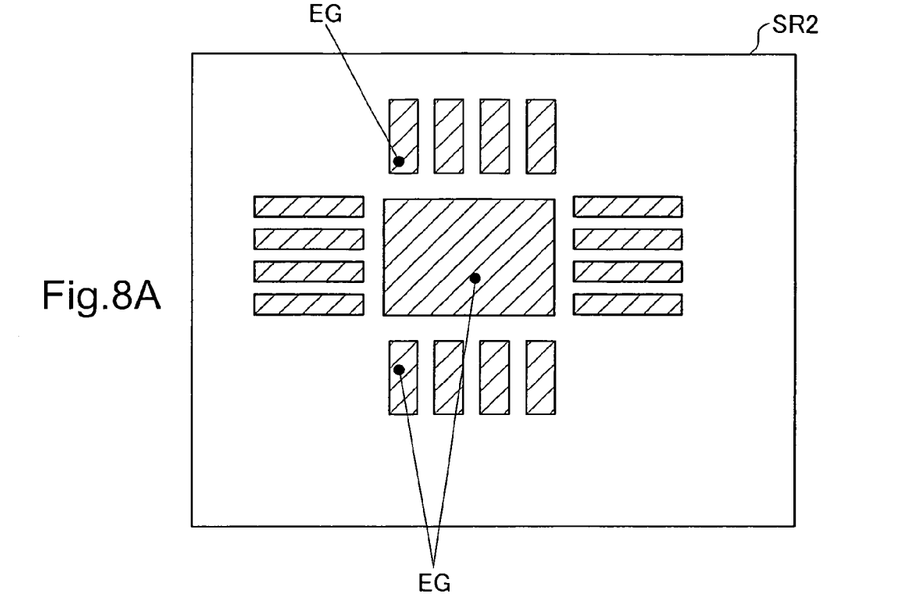
FIG. 8A depicts segmentation result of the second image IM2 performed at step S140.
Figure 8B:
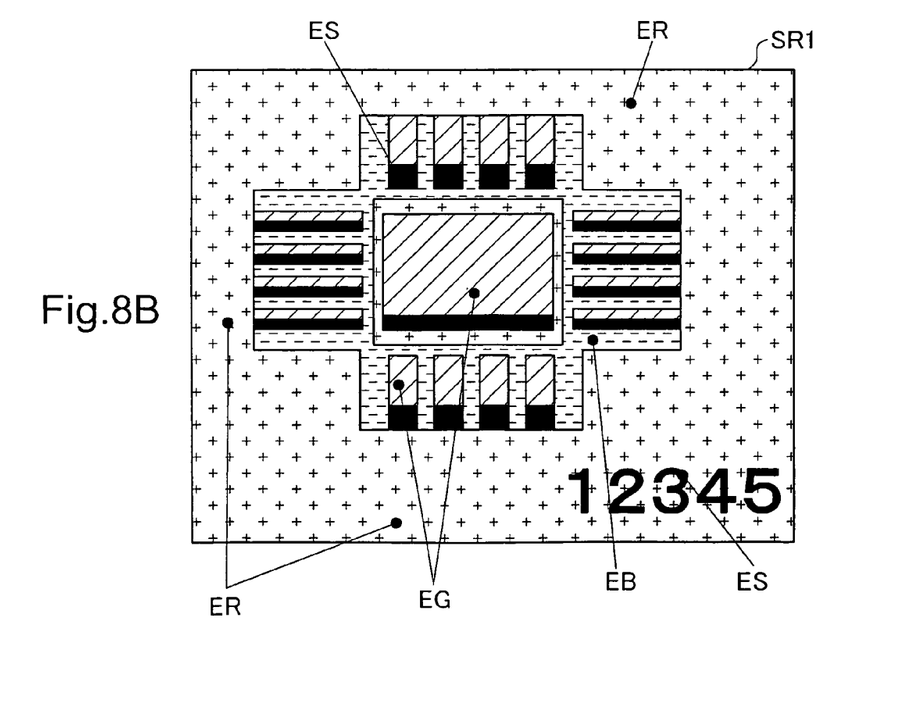
FIG. 8B depicts segmentation result of the first image IM1 performed at step S150

FIG. 8A depicts segmentation result of the second image IM2 performed at step S140, and FIG. 8B depicts segmentation result of the first image IM1 performed at step S150. As shown in the segmentation result SR2 of the second image IM2 in FIG. 8A, the extraction area selected for identifying the surface region layout is the gold area EG, so of the gold area EG and the non-gold area EX resulting from segmentation of the second image IM2, the gold area EG is extracted. Also, as shown in the segmentation result SR1 of the first image IM1 of FIG. 8B, the first image IM1 is divided into the resist area ER, the silk area ES, the gold area EG, and the base area EB. With the segmentation result shown in FIG. 8B, the black area K2 which belongs to the gold area EG (FIG. 4) intrinsically is classified to the silk area ES same as the black area K1.

At step S160 (FIG. 3), the surface region layout identification unit 640 (FIG. 1) integrates segmentation results of the first image and the second image. In specific terms, the surface region layout identification unit 640 integrates the two segmentation results by superimposing the first image segmentation result and the second image segmentation result. The surface region layout as the result of integrating of these two images is obtained by overwriting the extracted area EG, which is extracted from the segmentation result of the second image, on the segmentation result of the first image.

Figure 9:
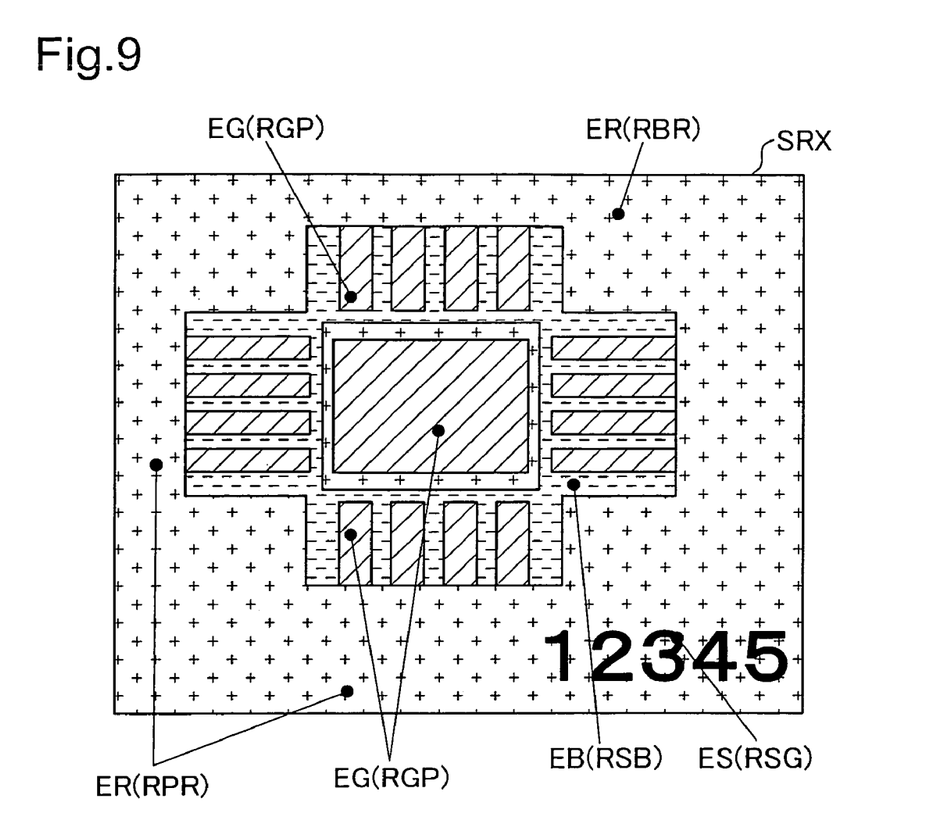
FIG. 9 depicts the integration result SRX of the two segmentation results SR1 and SR2.

FIG. 9 depicts the integration result SRX of the two segmentation results SR1 and SR2. As shown in FIG. 9, the areas intrinsically belonging to the gold area EG, which is classified to the silk area ES in the segmentation result SR1, is changed to the gold area EG by superimposing the segmentation result SR2 on the segmentation result SR1. Both of the base resist region RBR and the pattern resist region RPR of the printed circuit board PCB (FIG. 2) are extracted as the resist area ER from the integration results SRX. Similarly, the silk printed region RSG is extracted as the silk area ES, the gold plated region RGP is extracted as the gold area EG, and the board base region RSB is extracted as the base area EB from the integration results SRX.

In this way, with the first embodiment, segmentation is performed on each of the two images of the printed circuit board captured under the two illumination conditions of oblique illumination and incident-light illumination. The layout of each region on the printed circuit board may be identified from the layout of the image areas extracted by means of integration of these segmentation results.

A data representing the layout of each region on the printed circuit board subject to testing (subject layout data) is supplied to a testing unit (not illustrated) of the printed circuit board tester 100 (FIG. 1). The testing unit compares, a reference layout data which represents layout of each region on printed circuit board without defect obtained in advance, and the subject layout data. When there is a difference between the two data that is grater than the allowable value, the part that has such difference is detected as a defect of the printed circuit board.

For the reference layout data, various types of data by which the layout of each region on printed circuit board without defect is represented may be used. For example, the reference layout data may be obtained by means of acquirement of color images of defect free printed circuit board under oblique illumination and incident-light illumination, and identification of layout of each region on defect free printed circuit board from the acquired color images as described above. The reference layout data may also be obtained from layout of each region included in the design data for printed circuit board (CAD data).

Note that with this embodiment, when a plurality of representative points is set for a single extraction area, the average color of the colors at the representative points are used as the representative color of that extraction area. It is also possible to set the color at each of the representative points as the representative colors for segmentation.

B. Second Embodiment

Figure 10:
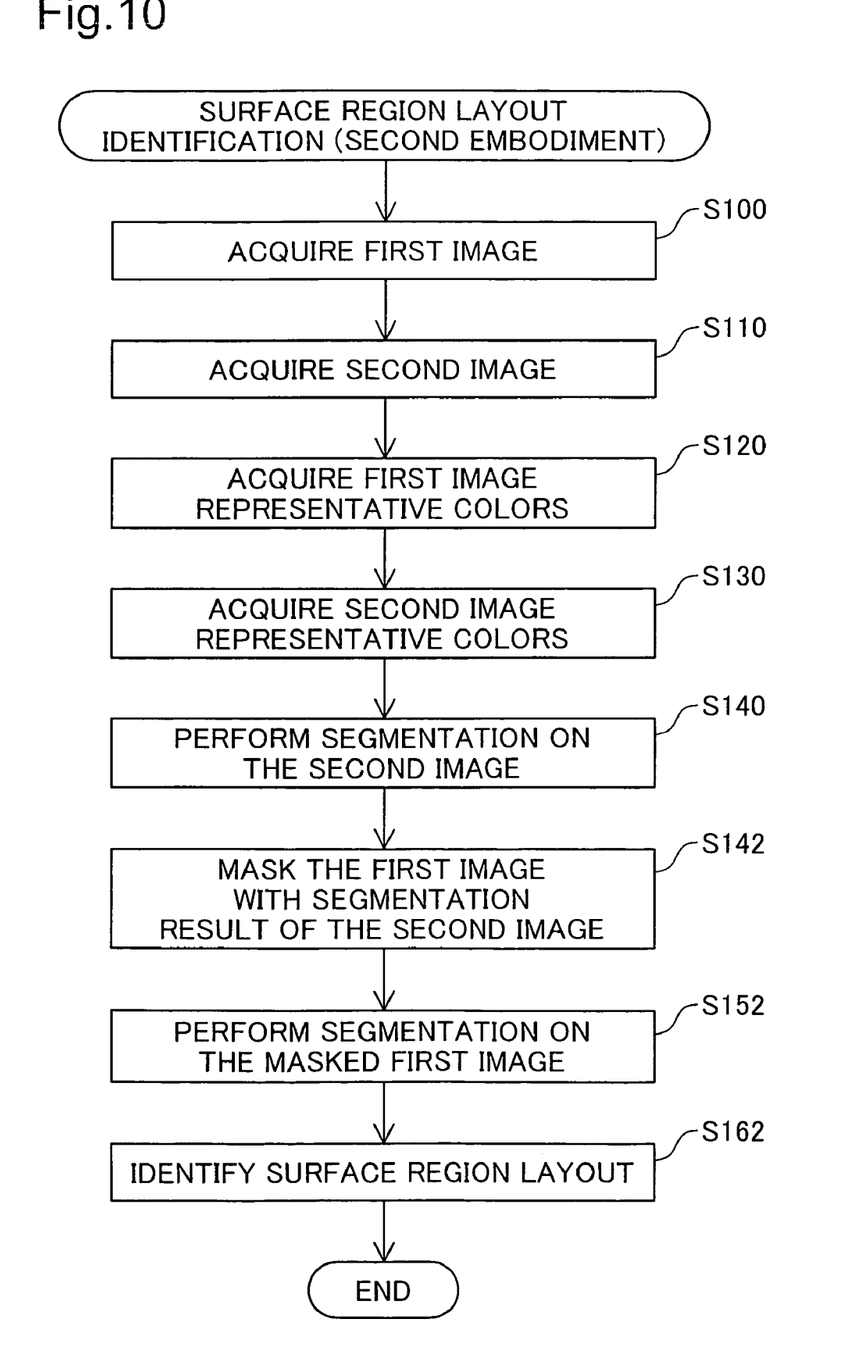
FIG. 10 is a flowchart showing the procedure for identifying the surface region layout of the printed circuit board PCB for the second embodiment.

FIG. 10 is a flowchart showing the procedure for identifying the surface region layout of the printed circuit board PCB for the second embodiment. This differs from the flowchart of the first embodiment shown in FIG. 3 in that step S142 is added after the step S140 and the steps S150 and S160 are replaced by steps S152 and S162. The other points are the same as the first embodiment.

At step S142 the area segmentation unit 630 (FIG. 1) masks the first image using the segmentation result of the second image generated at step S140. Then, at step S152, the part that is not masked of the first image undergoes segmentation by the area segmentation unit 630.

Figure 11A:
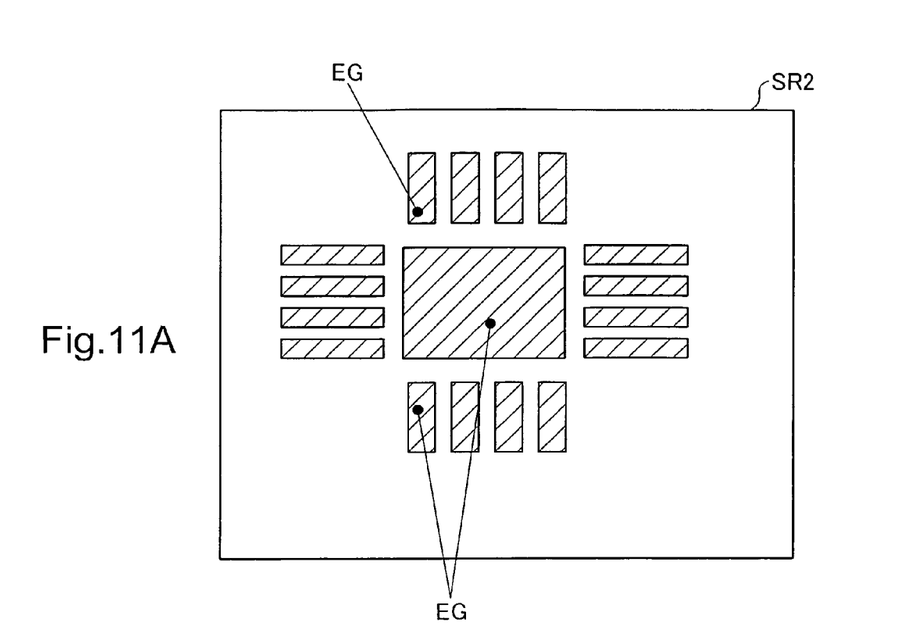
FIG. 11A depicts the segmentation result SR2 of the second image IM2.
Figure 11B:
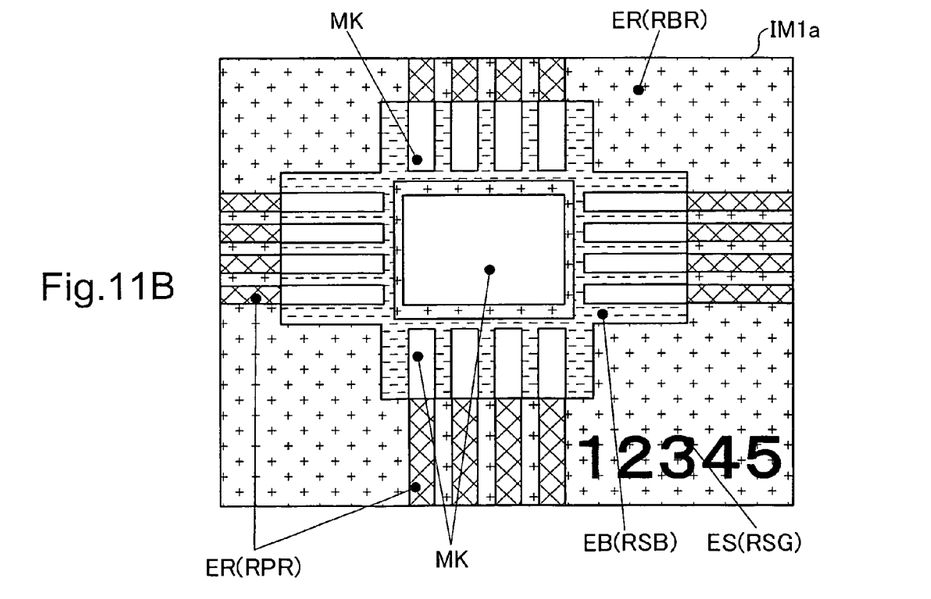
FIG. 11B depicts the first image IM1a masked by the segmentation result SR2.

FIG. 11A depicts the segmentation result SR2 of the second image IM2. The segmentation result SR2 of FIG. 11A and the segmentation result SR2 of the first embodiment (FIG. 8) are the same. FIG. 11B depicts the first image IM1a masked by the segmentation result SR2. With the example in FIG. 11B, of the first image IM1 (FIG. 4), the area MK corresponding to the gold area EG of the segmentation result SR2 is masked. Because of this, the masked first image IM1a is an image for which both the black area K2 and the gold area GL in the first image IM1 are changed to the mask area MK.

Figure 12A:
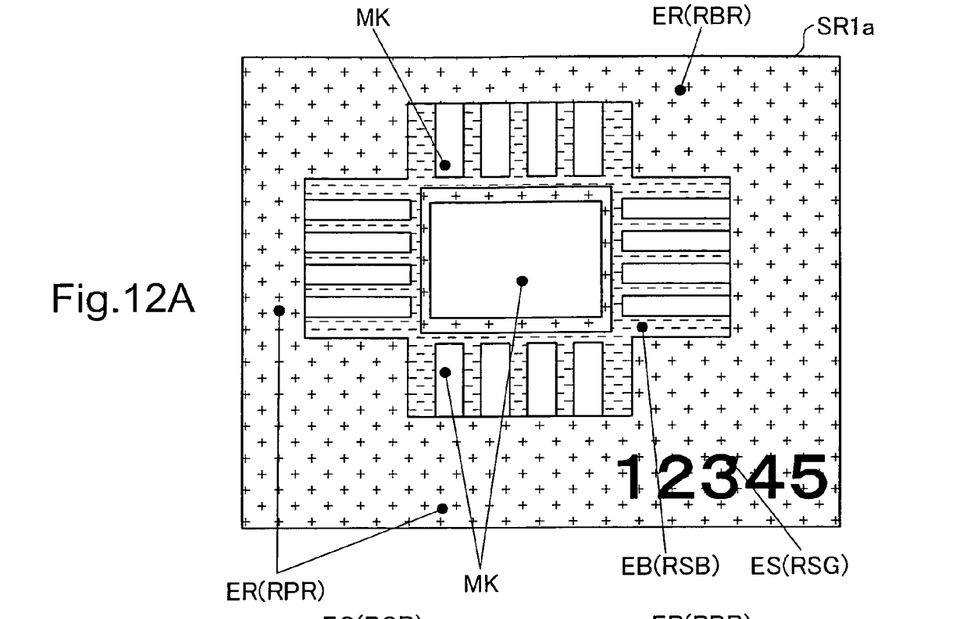
FIG. 12A depicts the segmentation result SR1a of the first image IM1a masked by the process of step S152.

FIG. 12A depicts the segmentation result SR1a of the first image IM1a masked by the process of step S152. The segmentation of the image IM1a is performed only for parts other than the mask area MK. Because of this, the segmentation result SR1a differs from the segmentation result SR1 (FIG. 8) of the first image IM1 in that the gold plated area divided into the unmasked gold area EG and the silk area ES becomes the mask area MK. The other points are the same as the segmentation result SR1 of the first image IM1.

Figure 12B:
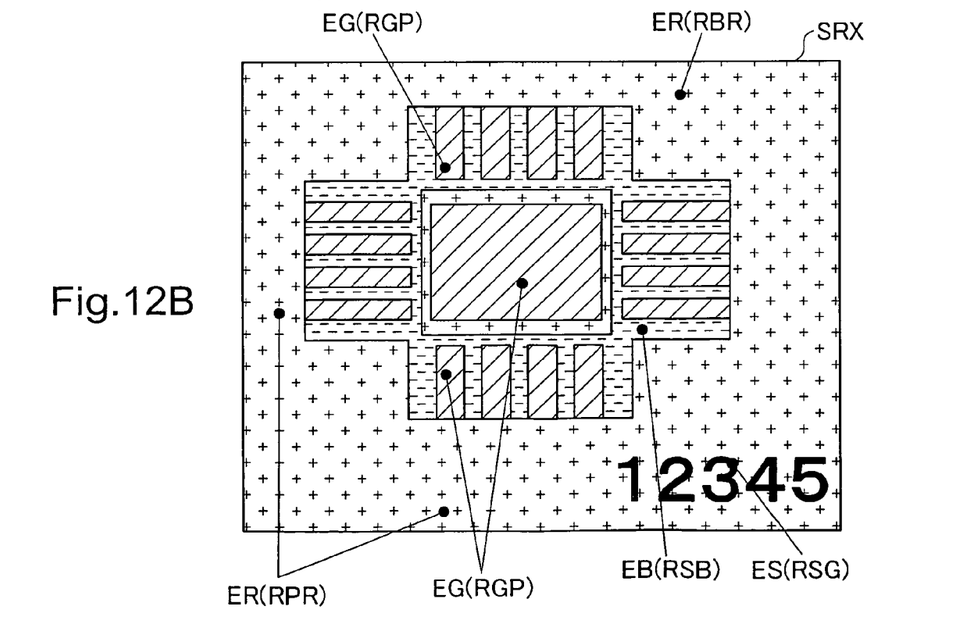
FIG. 12B illustrates the surface region layout SRX identified with the second embodiment.

At step S162, the surface region layout identification unit 640 changes the mask area MK of the segmentation result SR1a of the masked first image IM1a to the gold area EG. By changing the mask area MK to the gold area EG in this way, the surface region layout SRX is identified as shown in FIG. 12B. This surface region layout SRX and the surface region layout SRX identified with the first embodiment (FIG. 9) are the same.

In this way, even with the second embodiment, the same as with the first embodiment, it is possible to identify the layout of each region on the printed circuit board from the two images of the printed circuit board captured under the two illumination conditions of oblique illumination and incident-light illumination.

With the second embodiment, when the masked area of the first image IM1 is large, it is possible to reduce the required calculation time for segmentation of the masked fist image IM1a. At this point, the second embodiment is preferable to the first embodiment.

C. Modifications

The present invention is not limited to the aforementioned embodiments and working examples, and may be reduced to practice in various other modes without departing from the scope and spirit thereof, such as the following modifications, for example.

C1. Modification 1:

With each of the embodiments hereinabove, the surface region layout is identified from two images respectively captured under oblique illumination and incident-light illumination. In general, it is also possible to identify the surface region layout from any two or more images acquired under mutually different illumination conditions. In this case, by implementing a suitable logic operation on the extraction area obtained from each image, it is possible to identify the surface region layout. Also, as mutually different illumination conditions, it is possible to use various combinations other than the combination of oblique illumination and incident-light illumination. For example, it is possible to use any combination of illumination conditions that any one of direction of illuminating light, polarization of illuminating light, or source wavelength of illuminating light is different.

C2. Modification 2:

With each of the embodiments hereinabove, two color images of an object are captured and the surface region layout is identified from the images. For identifying the surface regions, it is also possible to use a black and white image or an image represented by specific color components. In general, for the image used for identifying the surface regions, it is possible to use an image as long as it is an image that can be divided into a plurality of areas by setting a suitable distance index value. For example, the surface region layout may be identified from the first image which is a color image represented by two or more color components, and the second image which is a black and white image.

C3. Modification 3:

The surface region identification according to the present invention may be applied not only for the printed circuit board, but also for any object having a plurality of surface regions, of which the captured images provides different segmentation results according to the illumination conditions. For example, the surface region identification is also applicable for an object with pattern thereon, such as a semiconductor wafer, a glass substrate, a film, and a printed matter, and for an object such as a mechanical part having a complex shape. By applying the present invention, it is possible to identify layout of the pattern which is formed on the surface of objects, such as a printed circuit board, a semiconductor wafer, a glass substrate, a film, and a printed matter. Because of this, the present invention is applicable for inspection apparatus or inspection method for the pattern formed on the surface of these objects.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for identifying layout of a plurality of surface regions on an object, the method comprising the steps of:
    (a) acquiring a plurality of images of the object under a plurality of mutually different illumination conditions;
    (b) obtaining layouts of a plurality of image areas different from the layout of the plurality of surface regions on the object by performing segmentation on the plurality of images respectively; and
    (c) identifying the layout of the plurality of surface regions based on the layouts of the plurality of image areas,
    wherein the step (a) includes the steps of
    acquiring a first image of the object under a first illumination condition wherein an image area corresponding to a first surface region among the plurality of surface regions is reproducible by segmentation of the first image; and
    acquiring a second image of the object under a second illumination condition wherein an image area corresponding to a second surface region among the plurality of surface regions is reproducible by segmentation of the second image, the second surface region being to be represented by two or more image areas in a segmentation result of the first image, and
    the step (b) includes the steps of:
    (b1) obtaining a layout of an image area corresponding to a surface region including the first surface region by segmentation of at least a part of the first image; and
    (b2) obtaining a layout of an image area corresponding to a surface region including the second surface region by segmentation of the second image.

2. A method according to claim 1, wherein the step (b1) has the steps of:
    masking the first image by an image mask corresponding to the second surface region identified by segmentation of the second image at the step (b2); and
    performing segmentation on the part of the first image that is not masked by the image mask.

3. A method according to claim 1, wherein the first illumination condition is oblique illumination, and the second illumination conditions is incident-light illumination.

4. A method according to claim 1, wherein the first surface region is not a metallic luster region, and the second surface region is a metallic luster region.

5. An apparatus for identifying layout of a plurality of surface regions on an object, the apparatus comprising:
    an image acquisition unit configured to acquire a plurality of images of the object under a plurality of mutually different illumination conditions;
    an image area obtainment unit configured to obtain layouts of a plurality of image area different from the layout of the plurality of surface regions on the object by performing segmentation on the plurality of images respectively; and
    a surface region layout identification unit configured to identify the layout of the plurality of surface regions based on the layouts of the plurality of image areas,
    wherein the image acquisition unit includes:
    a first image acquisition unit configured to acquire a first image of the object under a first illumination condition wherein an image area corresponding to a first surface region among the plurality of surface regions is reproducible by segmentation of the first image; and
    a second image acquisition unit configured to acquire a second image of the object under a second illumination condition wherein an image area corresponding to a second surface region among the plurality of surface regions is reproducible by segmentation of the second image, the second surface region being to be represented by two or more image areas in a segmentation result of the first image, and
    wherein image area obtainment unit includes:
    a first layout obtainment unit configured to obtain a layout of an image area corresponding to a surface region including the first surface region by segmentation of at least a part of the first image; and
    a second layout obtainment unit configured to obtain a layout of an image area corresponding to a surface region including the second surface region by segmentation of the second image.

6. A method for detecting a defect of an object wherein the defect appears as a change in layout of a plurality of surface regions on the object, the method comprising the steps of:
    (a) acquiring a plurality of images of the object under a plurality of mutually different illumination conditions;
    (b) obtaining layouts of a plurality of image areas different from the layout of the plurality of surface regions on the object by performing segmentation on the plurality of images respectively;
    (c) identifying the layout of the plurality of surface regions based on the layouts of the plurality of image areas; and
    (d) detecting the defect in accordance with the layout of the plurality of surface regions,
    wherein the step (a) includes the steps of acquiring a first image of the object under a first illumination condition wherein an image area corresponding to a first surface region among the plurality of surface regions is reproducible by segmentation of the first image; and acquiring a second image of the object under a second illumination condition wherein an image area corresponding to a second surface region among the plurality of surface regions is reproducible by segmentation of the second image, the second surface region being to be represented by two or more image areas in a segmentation result of the first image, and the step (b) includes the steps of:

(b1) obtaining a layout of an image area corresponding to a surface region including the first surface region by segmentation of at least a part of the first image; and (b2) obtaining a layout of an image area corresponding to a surface region including the second surface region by segmentation of the second image.

7. An apparatus for detecting a defect of an object wherein the defect appears as a change in layout of a plurality of surface regions on the object, the apparatus comprising:

an image acquisition unit configured to acquire a plurality of images of the object under a plurality of mutually different illumination conditions;

an image area obtainment unit configured to obtain layouts of a plurality of image areas different from the layout of the plurality of surface regions on the object by performing segmentation on the plurality of images respectively;

a surface region layout identification unit configured to obtain the layout of the plurality of surface regions based on the layouts of the plurality of image areas; and a testing unit configured to detect the defect in accordance with the layout of the plurality of surface regions, wherein the image acquisition unit includes:

a first image acquisition unit configured to acquire a first image of the object under a first illumination condition wherein an image area corresponding to a first surface region among the plurality of surface regions is reproducible by segmentation of the first image; and a second image acquisition unit configured to acquire a second image of the object under a second illumination condition wherein an image area corresponding to a second surface region among the plurality of surface regions is reproducible by segmentation of the second image, the second surface region being to be represented by two or more image areas in a segmentation result of the first image, and wherein image area obtainment unit includes:

a first layout obtainment unit configured to obtain a layout of an image area corresponding to a surface region including the first surface region by segmentation of at least a part of the first image; and a second layout obtainment unit configured to obtain a layout of an image area corresponding to a surface region including the second surface region by segmentation of the second image.

* * * * *